(12) United States Patent
Orsini

(10) Patent No.: US 7,896,399 B1
(45) Date of Patent: Mar. 1, 2011

(54) EXHAUST SYSTEM REPAIR APPARATUS

(76) Inventor: Pete Orsini, Webster, NY (US)

( * ) Notice: Subject to any disclaimer, the term of this patent is extended or adjusted under 35 U.S.C. 154(b) by 620 days.

(21) Appl. No.: 12/026,184

(22) Filed: Feb. 5, 2008

(51) Int. Cl.
*F16L 55/18* (2006.01)

(52) U.S. Cl. .......................... 285/15; 248/74.4; 24/19; 135/97

(58) Field of Classification Search ........................ None
See application file for complete search history.

(56) References Cited

U.S. PATENT DOCUMENTS

| | | |
|---|---|---|
| 3,137,053 A | 6/1964 | Osborn et al. |
| 4,056,869 A | 11/1977 | Eisma, Jr. |
| 4,079,487 A | 3/1978 | Coop, Sr. |
| 4,403,378 A | 9/1983 | Engman |
| D273,938 S | 5/1984 | Piper |
| 4,506,418 A | 3/1985 | Viola et al. |
| 4,730,852 A * | 3/1988 | Arscott .......................... 285/15 |
| 5,961,153 A * | 10/1999 | Foster .......................... 285/15 |
| D436,028 S * | 1/2001 | Wagner et al. ................ D8/396 |
| 6,234,541 B1 * | 5/2001 | Wagner et al. ............... 285/197 |
| 6,775,890 B2 * | 8/2004 | Kolarik ......................... 29/235 |
| 7,322,614 B2 * | 1/2008 | Reeves ......................... 285/15 |

* cited by examiner

*Primary Examiner*—Jack W. Lavinder
(74) *Attorney, Agent, or Firm*—Crossley Patent Law; Mark A. Crossley

(57) ABSTRACT

A exhaust system repair apparatus provides a basic u-bolt member and saddle clamp design which can be positioned behind an existing damaged flange, one which cannot be tightened against an opposing flange in order to create an exhaust seal. The apparatus features ears which are attached to and positioned proximal to the u-bolt base. Each ear further comprises a slot to align with an opposing, existing flanges' holes. Slots are available which are exactly positioned for a given application, or the elongated slots are provided in other embodiments which provide a more universal fit. The apparatus thereby provides for tightening the damaged flange against an undamaged opposing flange, without having to replace a damaged flange.

18 Claims, 3 Drawing Sheets

EXHAUST SYSTEM REPAIR APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Muffler clamps comprising u-bolts and saddles are well known in the automotive industry. The use of such clamps is widespread. The use of flanges for connecting various exhaust components is also well known. Whether as original equipment or in exhaust system repair, both flanges and clamps are widely used in the industry. Flanges are typically used to connect one pipe to another, a muffler to a pipe, a catalytic converter to a pipe, or a pipe to a manifold, as examples. Flanges are often of a two-bolt variety wherein bolt holes are offset by 180 degrees. Some form of gasket is usually used between connecting flanges. Often in the industry, a flange is damaged such that it must be replaced. Damage often comprises a broken side wherein a bolt hole portion of the flange is missing, thereby negating the ability of one flange to be correctly mated to the opposing flange for gasket and exhaust sealing. Damage can also be a bent side which does not allow for proper seal against an opposing flange.

Damage can also be a result of having to cut a flange to remove a frozen bolt, as further example. Replacement can vary from difficult to almost impossible. Often damaged flanges are in very confined spaced, or are coupled to an expensive catalytic converter, for example. The present apparatus uniquely provides the basic convenience of a u-bolt and saddle clamp with repair capabilities such that a damaged flange need not be replaced, thereby saving significant labor time and parts costs.

FIELD OF THE INVENTION

The exhaust system repair apparatus relates to clamps for vehicle exhaust systems and more especially to a clamping exhaust system repair apparatus that negates the need to replace damaged exhaust flanges.

SUMMARY OF THE INVENTION

The general purpose of the exhaust system repair apparatus, described subsequently in greater detail, is to provide an exhaust system repair apparatus which has many novel features that result in an improved exhaust system repair apparatus which is not anticipated, rendered obvious, suggested, or even implied by prior art, either alone or in combination thereof.

To attain this, the exhaust system repair apparatus provides a basic u-bolt member and saddle clamp design which can be positioned behind an existing damaged flange, one which cannot be tightened against an opposing flange in order to create an exhaust seal. The apparatus features ears which are positioned proximal to the u-bolt base. Each ear further comprises an elongated slot to align with an opposing, existing flanges' holes. Slots are available which are exactly positioned for a given application, or the elongated slots are provided in other embodiments which provide a more universal fit. The apparatus provides connecting bolts, or bolts may be had via the marketplace. The saddle is made of stamped or cold rolled steel, or can be cast or forged, depending upon applications. The u-bolt ears are ideally of a width equal to the u-bolt thickness, thereby enabling sufficient clamping force against the opposing flange without ear fatigue. The u-bolt and ears, depending upon the varying embodiments, are welded together, stamped together, cast together, or forged together, as examples of the various embodiments of u-bolt member manufacturing. The apparatus is provided in varying diameter designs, to accommodate various exhaust system diameters.

Thus has been broadly outlined the more important features of the improved exhaust system repair apparatus so that the detailed description thereof that follows may be better understood and in order that the present contribution to the art may be better appreciated.

An object of the exhaust system repair apparatus is to be basic.

Another object of the exhaust system repair apparatus is to save money on vehicle repairs.

A further object of the exhaust system repair apparatus is to be easily used.

An added object of the exhaust system repair apparatus is to gain access to repairs in confined spaces.

And, an object of the exhaust system repair apparatus is to prevent expensive part replacement.

These together with additional objects, features and advantages of the improved exhaust system repair apparatus will be readily apparent to those of ordinary skill in the art upon reading the following detailed description of presently preferred, but nonetheless illustrative, embodiments of the improved exhaust system repair apparatus when taken in conjunction with the accompanying drawings.

In this respect, before explaining the current embodiments of the improved exhaust system repair apparatus in detail, it is to be understood that the exhaust system repair apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved exhaust system repair apparatus. It is therefore important that the claims be regarded as including such equivalent constructions insofar as they do not depart from the spirit and scope of the exhaust system repair apparatus. It is also to be understood that the phraseology and terminology employed herein are for purposes of description and should not be regarded as limiting.

DETAILED DESCRIPTION OF THE DRAWINGS

Figure 1:
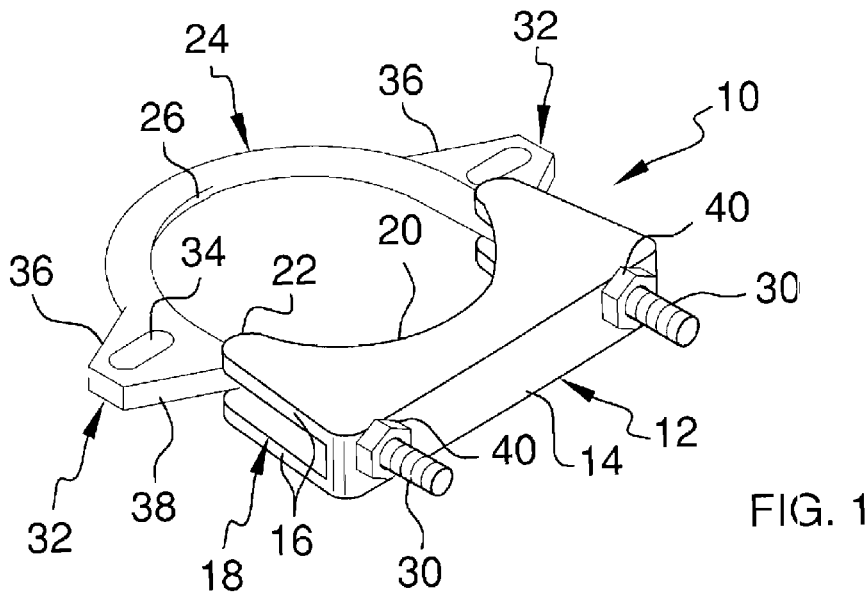
FIG. 1 is a perspective view.
Figure 2:
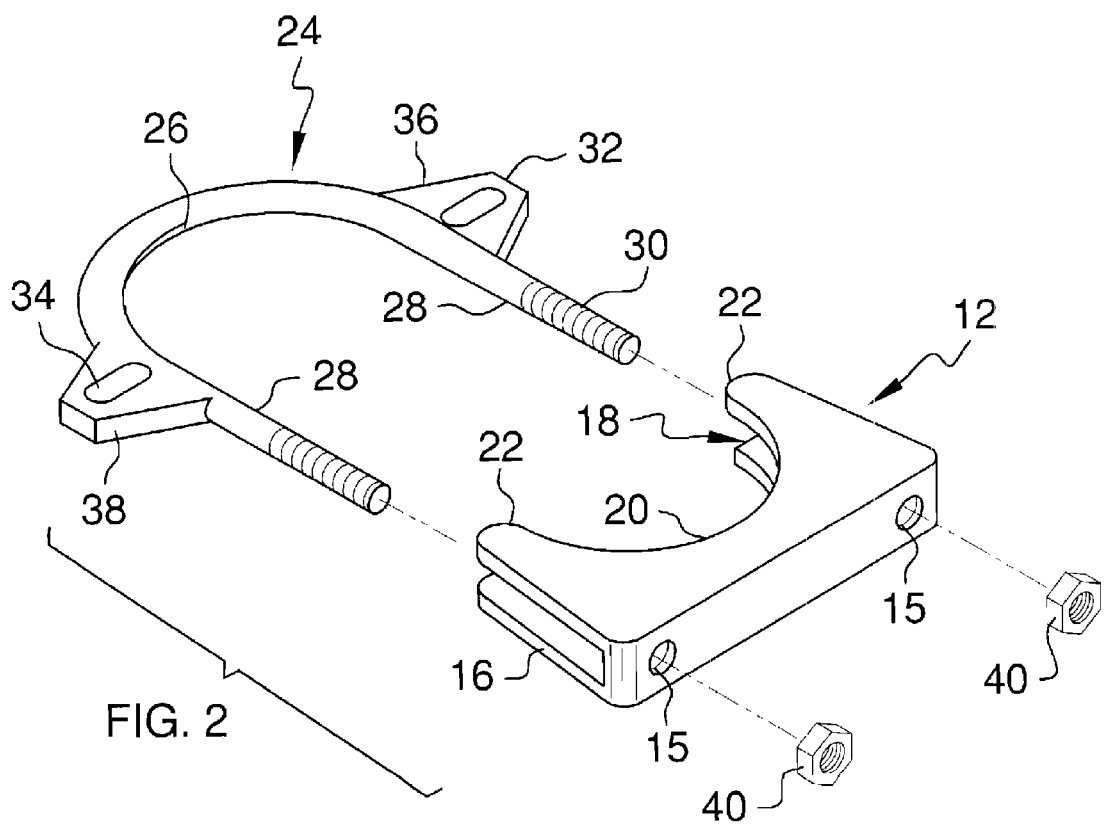
FIG. 2 is an exploded perspective view.
Figure 3:
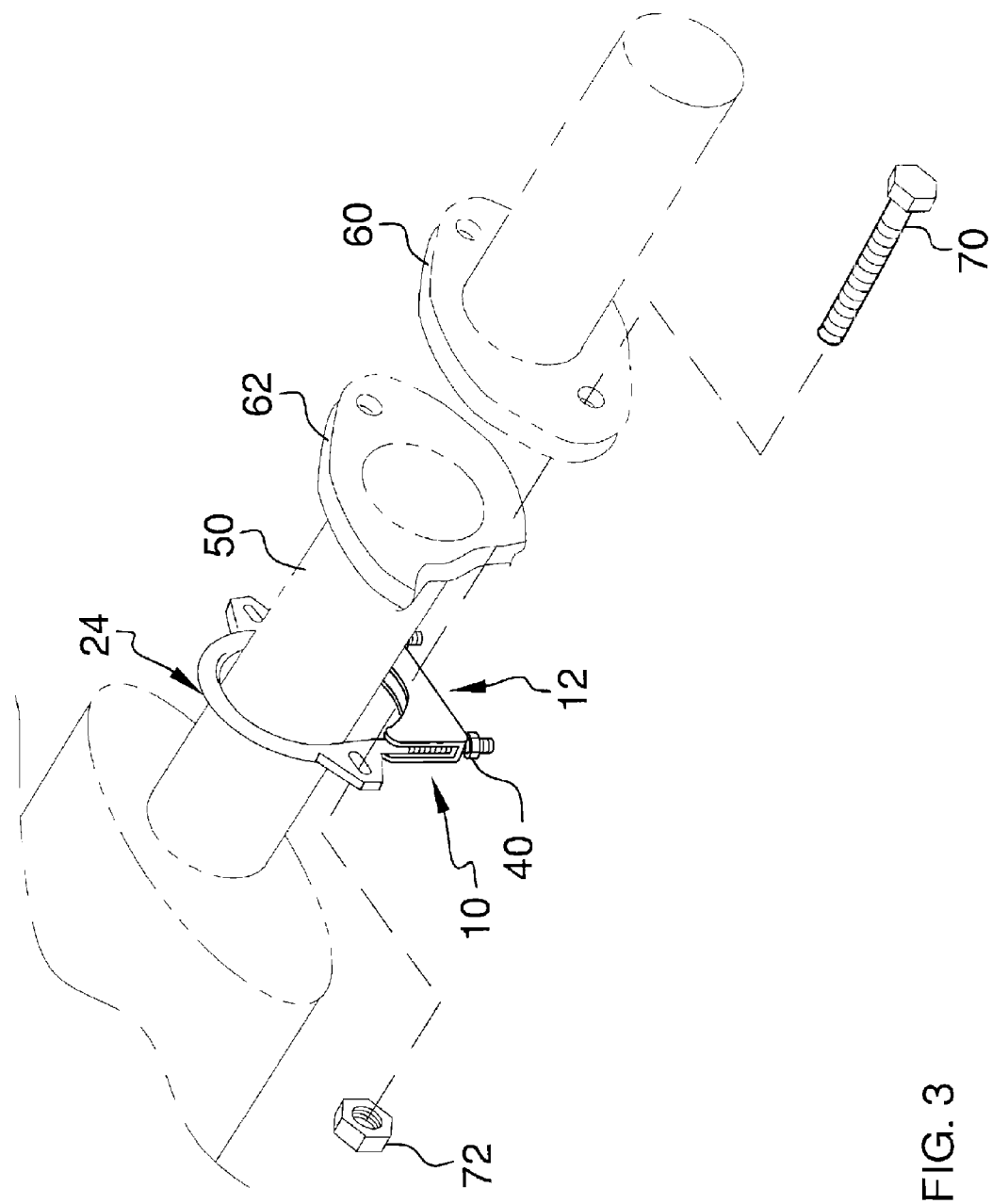
FIG. 3 is a perspective view of the apparatus in use.
Figure 4:
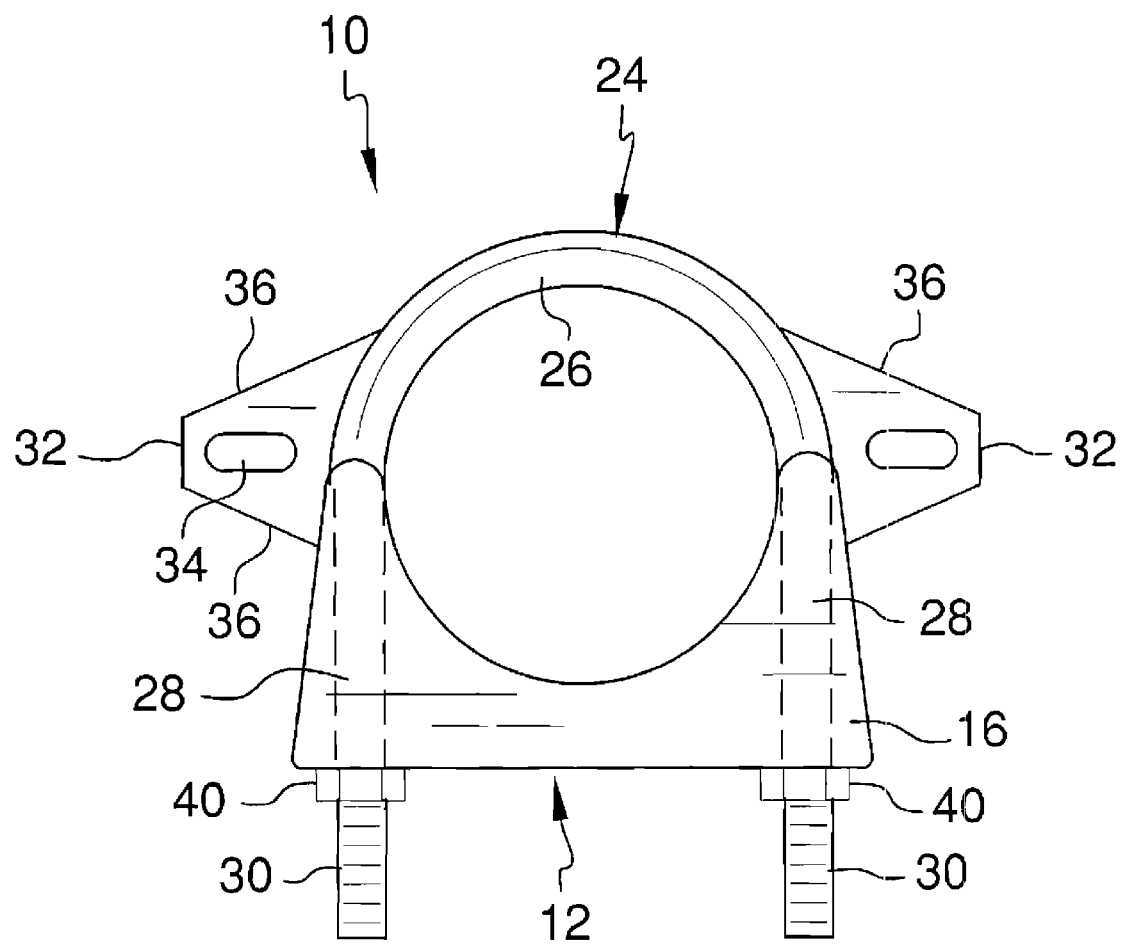
FIG. 4 is a front plan view.

With reference now to the drawings, and in particular FIGS. 1 through 4 thereof, the principles and concepts of the exhaust system repair apparatus generally designated by the reference number 10 will be described.

Referring to FIGS. 1-4, the exhaust system repair apparatus 10 is for use with an existing exhaust system in need of repair. The apparatus 10 is for placement around an existing exhaust pipe 50 proximal to a damaged flange 62. Such typically damaged flanges 62 are opositionally mated to an existing flange 60 which may be in good repair. A flange 60 and damaged flange 62 usually oppose each other with some form of gasket between, such as a donut gasket or flat gasket. The exhaust system repair apparatus 10 comprises a saddle 12 for fit to one side of an existing exhaust pipe 50. The saddle 12 comprises a bottom 14 with a pair of spaced apart orifices 15. The pair of spaced apart parallel sides 16 are perpendicularly affixed to each opposed side of the bottom 14. Each side 16 has a semicircular inner radius 20 which mates against an existing exhaust pipe 50.

Each side 16 further comprises rounded edges 22 at the termination of each semicircular inner radius 20. This rounded edge 22 feature prevents an occurrence which is common with many existing exhaust clamps, wherein a sharp edge is provided, one which can crimp or cut into an existing exhaust pipe 50. The spaced apart arrangement of the sides 16 provides the void 18 therebetween. The u-bolt member 24 member has a semicircular base 26 affixed to the pair of parallel spaced apart u-bolt legs 28. Each leg 28 terminates in a length of male threads 30. A removable nut 40 is provided for each male threads 30. An ear 32 is affixed outwardly to each leg 28. Each ear 32 is proximal to the semicircular base 26. Each ear 32 further comprises an angle 36 such that the inner side of each ear 32 is of greater width than the outer side of each ear 32. Each angled ear 32 thereby provides greater strength in its attachment to each leg 28 respectively. Further, the lessened dimension of the outer side of each ear 32 provides for best clearance in what are often confined spaces. Additionally, each ear 32 further comprises a thickness 38 equal the thickness of the u-bolt base 26 and legs 28. Providing such ear 32 thickness 38 increases the structural integrity of each ear 32 thereby further enhancing clamping capability of the apparatus to the opposing flange 60. An elongated slot 34 is disposed within each ear 32. Each elongated slot 34 is directionally disposed from the inner edge of each ear 32 to a point proximal to the outer edge of each ear 32. Each ear 32 freely slides within the void 18 between the parallel sides of the saddle 12.

In use, the apparatus 10 is placed on the side of the existing exhaust system where a problem exists with a damaged flange 62. Depending upon existing conditions, space available, and mechanical desires, the apparatus is fitted as closely to or distantly from the damaged flange 62 as needed, giving the apparatus 10 repair capabilities significant latitude in application. The saddle 12 is placed against one side of the pipe 60. The u-bolt member 24 is placed on the opposing side of the pipe 50. The threads 30 and legs 28 of the u-bolt member 24 are inserted into and through the orifices 15 of the saddle 12, respectively. The elongated slots 34 of the u-bolt 24 are positioned in alignment with holes in the opposing flange 60. Nuts 40 are then used to tighten the apparatus 10 about the pipe 50. Depending upon the distance between the ears 32 of the apparatus 10 and the opposing flange 60, correct fastening bolt 70 lengths are chosen for provision with various application embodiments. Original bolts of the vehicle may be used, or differing marketplace available bolts also. Typically, the appropriate gasket or gasket material is inserted between the damaged flange 62 and the opposing flange 60. Bolts 70 are then tightened via nuts 72 to pull the flange 60 and damaged flange 62 together. The void 18 provides for the ears 32 to pull well into the saddle 12, as needed. The apparatus 10 thereby saves costly repairs typically associated with damaged flange 62 replacement, especially when the damaged flange 62 is part of an exhaust member or assembly which is either expensive or difficult to access.

With respect to the above description then, it is to be realized that the optimum dimensional relationships for the parts of the exhaust system repair apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the exhaust system repair apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the exhaust system repair apparatus may be used.

Therefore, the foregoing is considered as illustrative only of the principles of the exhaust system repair apparatus. Further, since numerous modifications and changes will readily occur to those skilled in the art, it is not desired to limit the exhaust system repair apparatus to the exact construction and operation shown and described, and accordingly, all suitable modifications and equivalents may be resorted to, falling within the scope of the exhaust system repair apparatus.

What is claimed is:

1. An exhaust system repair apparatus for use proximal to a damaged exhaust flange, the apparatus comprising:
   a saddle for fit to an existing exhaust pipe proximal to the flange, the saddle comprising:
      a bottom with a pair of spaced apart orifices;
      a pair of spaced apart parallel sides perpendicularly affixed to an each opposed side of the bottom, whereby a void exists between each side, each side having a semicircular inner radius;
   a u-bolt member having a semicircular base affixed to a pair of parallel spaced apart u-bolt legs, each leg terminating in a length of male threads, the u-bolt member for fit to a side of the exhaust pipe opposite the saddle;
   a removable nut for each male threads;
   an ear affixed outwardly to each leg, each ear proximal to the semicircular base;
   a slot within each ear;
   whereby each ear freely slides within the void between the parallel sides of the saddle.

2. The apparatus according to claim 1 wherein each ear further comprises an angle such that an inner side of each ear is of a greater width than an outer side of each ear.

3. The apparatus according to claim 2 wherein each slot further comprises an elongated slot.

4. The apparatus according to claim 3 wherein each elongated slot is directionally disposed from the inner edge of each ear to a point proximal to the outer edge of each ear.

5. The apparatus according to claim 4 wherein each ear further comprises a thickness equal to a thickness of the u-bolt base and legs.

6. The apparatus according to claim 3 wherein each ear further comprises a thickness equal to a thickness of the u-bolt base and legs.

7. The apparatus according to claim 2 wherein each elongated slot is directionally disposed from the inner edge of each ear to a point proximal to the outer edge of each ear.

8. The apparatus according to claim 7 wherein each ear further comprises a thickness equal to a thickness of the u-bolt base and legs.

9. The apparatus according to claim 2 wherein each ear further comprises a thickness equal to a thickness of the u-bolt base and legs.

10. The apparatus according to claim 1 wherein each slot further comprises an elongated slot.

11. The apparatus according to claim 10 wherein each elongated slot is directionally disposed from the inner edge of each ear to a point proximal to the outer edge of each ear.

12. The apparatus according to claim 11 wherein each ear further comprises a thickness equal to a thickness of the u-bolt base and legs.

13. The apparatus according to claim 10 wherein each ear further comprises a thickness equal to a thickness of the u-bolt base and legs.

14. The apparatus according to claim 1 wherein each elongated slot is directionally disposed from the inner edge of each ear to a point proximal to the outer edge of each ear.

15. The apparatus according to claim 14 wherein each ear further comprises a thickness equal to a thickness of the u-bolt base and legs.

16. The apparatus according to claim 1 wherein each ear further comprises a thickness equal to a thickness of the u-bolt base and legs.

17. An exhaust system repair apparatus for use proximal to a damaged exhaust flange, the apparatus comprising:

a saddle for fit to an existing exhaust pipe proximal to the flange, the saddle comprising:
 a bottom with a pair of spaced apart orifices;
 a pair of spaced apart parallel sides perpendicularly affixed to an each opposed side of the bottom, whereby a void exists between each side, each side having a semicircular inner radius, each side further comprising rounded edges at a termination of each semicircular inner radius;
a u-bolt member having a semicircular base affixed to a pair of parallel spaced apart u-bolt legs, each leg terminating in a length of male threads, the u-bolt member for fit to a side of the exhaust pipe opposite the saddle;
a removable nut for each male threads;
an ear affixed outwardly to each leg, each ear proximal to the semicircular base, each ear having an angle such that an inner side of each ear is of a greater width than an outer side of each ear;
an elongated slot within each ear, each elongated slot directionally disposed from the inner edge of each ear to a point proximal to the outer edge of each ear;
whereby each ear freely slides within the void between the parallel sides of the saddle.

18. The apparatus according to claim 17 wherein each ear further comprises a thickness equal to a thickness of the u-bolt base and legs.

* * * * *